F. P. Baker,
Animal Trap.
No. 94,464. Patented Sep. 7. 1869.
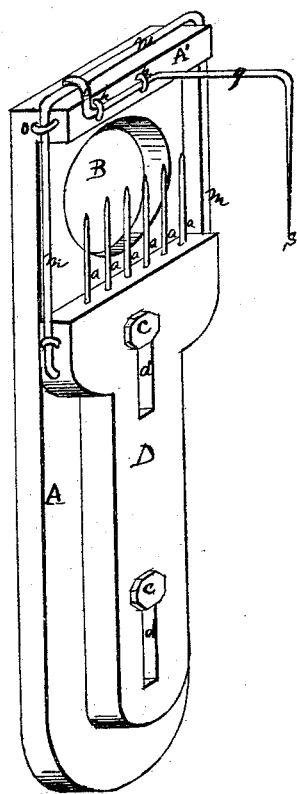
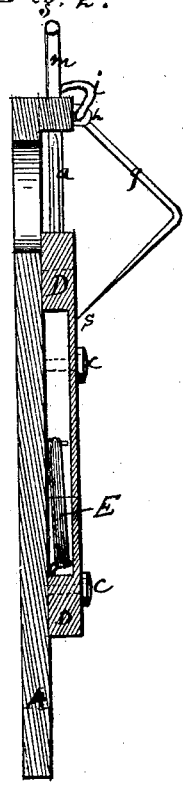
Witnesses.
H. S. G. Wilde.
Austin S. Howarth.
Franklin P. Baker
by Carroll D. Wright Atty

United States Patent Office.

FRANKLIN P. BAKER, OF BOSTON, MASSACHUSETTS, ASSIGNOR TO HIMSELF AND JAMES R. LOWE, OF SAME PLACE.

Letters Patent No. 94,464, dated September 7, 1869; antedated September 4, 1869.

IMPROVED ANIMAL-TRAP.

The Schedule referred to in these Letters Patent and making part of the same.

*To all whom it may concern:*

Be it known that I, FRANKLIN P. BAKER, of Boston, in the county of Suffolk, and State of Massachusetts, have invented certain improvements in Animal-Traps; and do hereby declare the following to be a full, clear, and exact description thereof, reference being had to the accompanying drawings, in which—

Figure 1 is a perspective view of my improved trap, showing the trap set.

Figure 2 is a longitudinal view, showing the trap sprung.

The object of my invention is to produce a cheap trap for catching small animals.

My invention consists in a board, with opening at one end, and a sliding frame, with a series of spits, so that when the trap is set with opening over the animal's hole, the spits being sprung, would impale anything coming through the opening in the board.

In the drawings—

A is a board, with opening B at one end.

D is a sliding board, shorter than A, and attached to A by head-bolts $c\ c$, the grooves $d\ d$ in board D allowing of play of board D upon A.

$a\ a\ a$ are spits, fastened into the end of board D, as shown, and when the trap is set, projecting near the edge of opening B, in the board A.

$m$ is a frame, extending from front of board D, through staples $o$, in the raised part A' of board A.

$g$ is a bait-hook, and also a trip-hook.

E is a rubber spring, contained in a recess between boards D and A.

Now, to set the trap, draw board D back, as shown in fig. 1, and against the force of spring E; this brings frame $m$ close to projection A; then turn hook $g$ up, as seen in fig. 2, and hold frame $m$ with the catch $i$, a part of $g$. This catch $i$ holds frame $m$ very sensitively. The bait is placed upon point S, so that when the trap is set, the bait is suspended over opening B. The set trap is placed so that opening B comes directly over the animal's hole in the floor or ground, and when he comes out sees nothing but the bait on point S, which he bites, and in so doing trips the catch $i$, which has been holding against the spring E, and the resistance to the spring being withdrawn, the board D passes quickly to the position shown in fig. 2, and the spits $a\ a$ impale the animal.

This trap is very cheap in construction, simple and efficient in action, and durable, while it takes up but little room.

What I claim, therefore, as my invention, and desire to secure by Letters Patent, is—

An animal trap, formed by the combination of boards A and D, constructed as shown, opening B, spits $a\ a\ a$, frame $m$, spring E, and bait and trip-hook $g$, substantially as set forth and described.

In testimony whereof, I have signed my name to this specification, in the presence of two subscribing witnesses.

FRANKLIN P. BAKER.

Witnesses:
CARROLL W. WRIGHT,
AUSTIN S. HOWARTH.